United States Patent
Hansen

(10) Patent No.: US 9,469,766 B2
(45) Date of Patent: Oct. 18, 2016

(54) AQUEOUS BINDER COMPOSITION FOR MINERAL FIBERS

(71) Applicant: Erling Lennart Hansen, Virum (DK)

(72) Inventor: Erling Lennart Hansen, Virum (DK)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 55 days.

(21) Appl. No.: 14/086,245

(22) Filed: Nov. 21, 2013

(65) Prior Publication Data

US 2014/0076197 A1 Mar. 20, 2014

Related U.S. Application Data

(63) Continuation of application No. 13/257,015, filed as application No. PCT/EP2010/053645 on Mar. 19, 2010, now Pat. No. 8,591,642.

(60) Provisional application No. 61/226,123, filed on Jul. 16, 2009.

(30) Foreign Application Priority Data

Mar. 19, 2009 (EP) .................................... 09155654

(51) Int. Cl.
| | | |
|---|---|---|
| *C09D 103/02* | (2006.01) | |
| *C09D 4/00* | (2006.01) | |
| *C03C 25/24* | (2006.01) | |
| *C08J 5/04* | (2006.01) | |
| *C08J 5/24* | (2006.01) | |
| *C09J 103/02* | (2006.01) | |
| *C13B 20/14* | (2011.01) | |
| *C13K 1/06* | (2006.01) | |
| *D04H 1/4209* | (2012.01) | |
| *D04H 1/587* | (2012.01) | |
| *D04H 1/64* | (2012.01) | |

(52) U.S. Cl.
CPC ............... *C09D 4/00* (2013.01); *C03C 25/24* (2013.01); *C08J 5/044* (2013.01); *C08J 5/24* (2013.01); *C09D 103/02* (2013.01); *C09J 103/02* (2013.01); *C13B 20/14* (2013.01); *C13K 1/06* (2013.01); *D04H 1/4209* (2013.01); *D04H 1/587* (2013.01); *D04H 1/64* (2013.01); *C08J 2367/00* (2013.01)

(58) Field of Classification Search
CPC ........... C03C 25/24; C08J 5/044; C08J 5/24; C08J 2367/00; C09J 103/02; C09D 103/02; C09D 4/00; C13K 1/06; D04H 1/4209; D04H 1/587; D04H 1/64; C13B 20/14
See application file for complete search history.

(56) References Cited

U.S. PATENT DOCUMENTS

| 5,318,990 A | 6/1994 | Strauss |
|---|---|---|
| 5,661,213 A | 8/1997 | Arkens et al. |
| 5,763,524 A | 6/1998 | Arkens et al. |
| 6,071,994 A | 6/2000 | Hummerich et al. |
| 6,221,973 B1 | 4/2001 | Arkens et al. |
| 6,706,853 B1 | 3/2004 | Stanssens et al. |
| 6,730,730 B1 | 5/2004 | Hansen et al. |
| 6,849,683 B2 | 2/2005 | Husemoen et al. |
| 6,878,800 B2 | 4/2005 | Husemoen et al. |
| 7,067,579 B2 | 6/2006 | Taylor et al. |
| 7,459,490 B2 | 12/2008 | Husemoen et al. |
| 7,766,975 B2 | 8/2010 | Clamen et al. |
| 8,114,210 B2 * | 2/2012 | Hampson ............ C03C 25/321 106/217.6 |
| 2002/0091185 A1 | 7/2002 | Taylor et al. |
| 2003/0153690 A1 | 8/2003 | Husemoen et al. |
| 2004/0024170 A1 | 2/2004 | Husemoen et al. |
| 2005/0137318 A1 | 6/2005 | Husemoen et al. |
| 2006/0079629 A1 | 4/2006 | Taylor et al. |
| 2006/0111480 A1 | 5/2006 | Hansen et al. |
| 2007/0006390 A1 | 1/2007 | Clamen et al. |
| 2007/0173588 A1 | 7/2007 | Espiard et al. |
| 2009/0227706 A1 | 9/2009 | Hansen et al. |
| 2010/0086726 A1 | 4/2010 | Jackson et al. |
| 2010/0252771 A1 | 10/2010 | Espiard et al. |
| 2012/0156953 A1 | 6/2012 | Eckert et al. |
| 2013/0032749 A1 | 2/2013 | Jaffrennou et al. |
| 2013/0127085 A1 | 5/2013 | Kalbe et al. |

FOREIGN PATENT DOCUMENTS

| EP | 583086 A1 | 2/1994 |
|---|---|---|
| EP | 0990727 A1 | 4/2000 |
| EP | 1741726 A1 | 1/2007 |
| WO | 9936368 A1 | 7/1999 |
| WO | 0105725 A1 | 1/2001 |
| WO | 0196460 A2 | 12/2001 |
| WO | 0206178 A1 | 1/2002 |
| WO | 2004007615 A1 | 1/2004 |
| WO | 2006061249 A1 | 6/2006 |
| WO | 2008089850 A1 | 7/2008 |

OTHER PUBLICATIONS

Fred. W. Schenk: "Glucose and Glucose-Containing Syrups", Ullmann's Encyclopedia of Industrial Chemistry, [Online] 2007, Retrieved from the Internet Aug. 18, 2009: http://dx.doi.org/10.1002/14356007.a12_457.pub.2.

* cited by examiner

*Primary Examiner* — David M Brunsman
(74) *Attorney, Agent, or Firm* — Abel Law Group, LLP

(57) ABSTRACT

An aqueous binder composition for mineral fibers comprises: (a) a sugar syrup containing a reducing sugar and having a dextrose equivalent DE of at least 50 and less than 85; (b) a polycarboxylic acid component; (c) an amine component; and, optionally, (d) a reaction product of a polycarboxylic acid component (b) and an amine component (c).

19 Claims, 1 Drawing Sheet

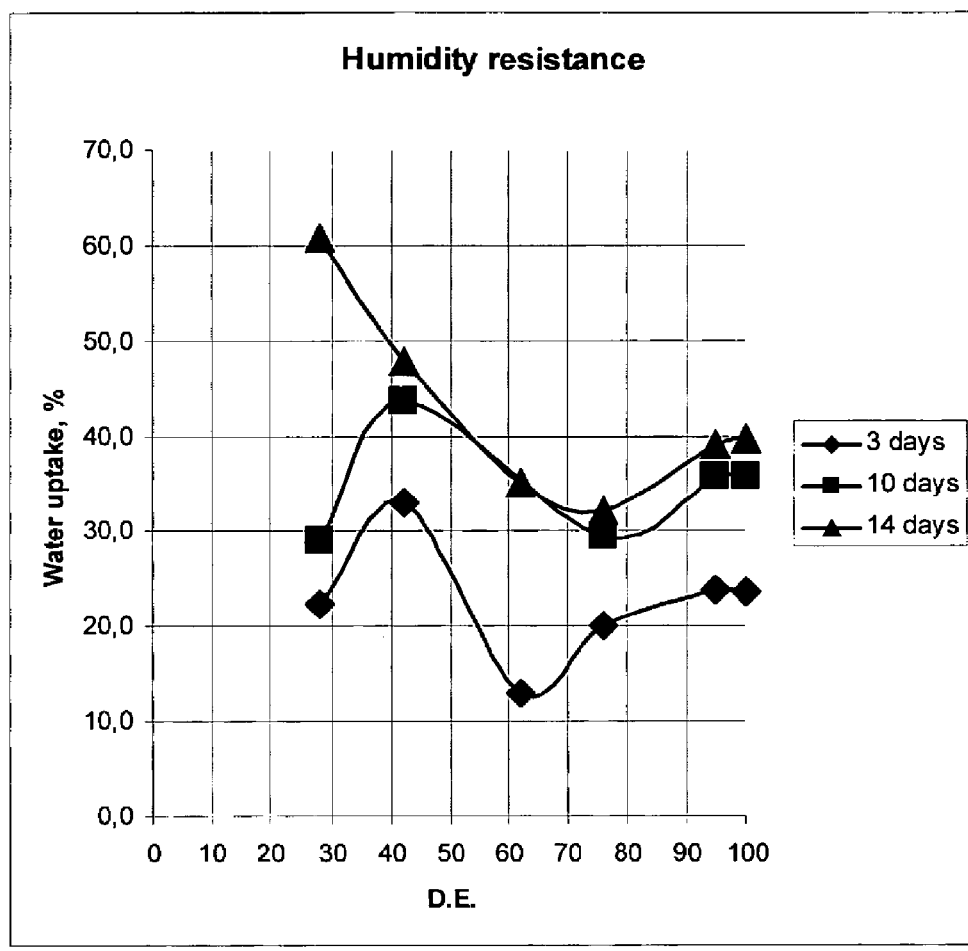

AQUEOUS BINDER COMPOSITION FOR MINERAL FIBERS

CROSS-REFERENCE TO RELATED APPLICATIONS

The present application is a continuation of U.S. application Ser. No. 13/257,015, which is a National Stage of International Application Number PCT/EP2010/053645, filed Mar. 19, 2010; the entire disclosures of these applications are expressly incorporated by reference herein.

FIELD OF THE INVENTION

The present invention relates to an aqueous binder composition, a method of producing said aqueous binder composition and to its use in the manufacture of bonded mineral fiber products. More specifically, the present invention relates to an aqueous binder composition produced from carbohydrate starting materials and to its use for bonding mineral fiber products.

BACKGROUND OF THE INVENTION

Mineral fiber products generally comprise man-made vitreous fibers (MMVF) such as, e.g., glass fibers, ceramic fibers, basalt fibers, slag wool, mineral wool and stone wool, which are bonded together by a cured thermoset polymeric binder material. For use as thermal or acoustical insulation products, bonded mineral fiber mats are generally produced by converting a melt made of suitable raw materials to fibers in conventional manner, for instance by a spinning cup process or by a cascade rotor process. The fibers are blown into a forming chamber and, while airborne and while still hot, are sprayed with a binder solution and randomly deposited as a mat or web onto a travelling conveyor. The fiber mat is then transferred to a curing oven where heated air is blown through the mat to cure the binder and rigidly bond the mineral fibers together.

In the past, the binder resins of choice have been phenol/formaldehyde resins which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol/formaldehyde binders are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties but may require expensive starting materials and, in particular, a high proportion of expensive anhydride reactants in order to achieve the desired water solubility, curing speed and curing density. Several of the above-mentioned patent publications therefore suggest the use of cheaper carbohydrates as additives, extenders or as reactive components of the binder system.

SUMMARY OF THE INVENTION

It has now been found that further improvements both in production costs and in application properties such as curing speed, curing density, durability and humidity resistance may be achieved by using specific types of carbohydrates in binder production.

Thus, in a first aspect, the present invention relates to an aqueous binder composition comprising:
(a) a sugar syrup containing a reducing sugar and having a dextrose equivalent DE of at least 50 and less than 85;
(b) a polycarboxylic acid component;
(c) an amine component; and, optionally,
(d) a reaction product of a polycarboxylic acid component (b) and an amine component (c).

In a further aspect, the present invention relates to a method of producing a bonded mineral fiber product which comprises the steps of contacting the mineral fibers or mineral fiber product with an aqueous binder composition as defined above, and curing the binder composition.

In accordance with another aspect of the present invention, there is provided a mineral fiber product comprising mineral fibers in contact with the cured binder composition defined above.

BRIEF DESCRIPTION OF THE DRAWINGS

In the accompanying drawing, FIG. 1 is a graph showing the water uptake in percent after 3, 10 and 14 days of several binder compositions set forth in the Examples below as a function of the dextrose equivalent DE of the sugar syrup present in the compositions.

DETAILED DESCRIPTION AND PREFERRED EMBODIMENTS

The aqueous binder composition according to the present invention comprises:
(a) a sugar syrup containing a reducing sugar and having a dextrose equivalent DE of at least 50, for instance, at least 60 or 65, and less than 85, for instance, less than 80 or 75;
(b) a polycarboxylic acid component;
(c) an amine component; and, optionally,
(d) a reaction product of a polycarboxylic acid component (b) and an amine component (c).

Sugar Component (a)

Glucose is formed in plants from carbon dioxide absorbed from the air using sunlight as energy source. Part of the glucose is polymerised into long chains of glucose and stored as starch in granules as a reserve. Another glucose polymer found in plants is cellulose. Compared to cellulose, starch is made up of alpha-glucosidic bonds, which result in helix-shaped molecules, while cellulose is build with beta-glucosidic bonds giving straight molecules and a fibrous structure.

For commercial manufacture of crystalline dextrose, an aqueous slurry of starch is subjected to hydrolysis by means of heat, acid or enzymes. Depending on the reaction conditions employed in the hydrolysis of starch, a variety of mixtures of glucose and intermediates is obtained which may be characterized by their DE number. DE is an abbreviation for Dextrose Equivalent and is defined as the content of reducing sugars, expressed as the number of grams of anhydrous D-glucose per 100 g of the dry matter in the sample, when determined by the method specified in International Standard ISO 5377-1981 (E). This method measures reducing end groups and attaches a DE of 100 to pure glucose (=dextrose) and a DE of 0 to pure starch.

Hydrolytic cleavage of the starch may be stopped at different stages of the process resulting in carbohydrate mixtures (sugar syrups) having different DE numbers, i.e.

having different molecular weight distribution and different reactivity. The starting point for the process is a purified starch milk, i.e. a native starch such as corn or cassava potato which has been treated by e.g. cleaning, milling, washing and made into a slurry preparation.

Only glucose syrup of high DE can crystallize easily and yield a product in powder or granular form. A most popular crystallized product is dextrose monohydrate with application in medicine and chewing tablets. Dextrose monohydrate is pure glucose (DE 100).

With lower DE numbers, the syrup gradually loses its tendency to crystallize. Below approx. 45 DE, the syrup can be concentrated into a stable, non-crystallizing liquid, for instance, standard 42 DE syrup which finds wide spread use in canned fruit preserves, ice cream, bakery products, jam, candy, and all kinds of confectionery.

The present invention is based on the surprising finding that the more high-molecular components of the starch hydrolysate (sugar syrup) do not contribute significantly to the formation of the cross-linked binder network. Furthermore, it has been shown that the high-molecular species in the crude hydrolysate do not negatively influence the binder properties in terms of hydrolytic stability and durability, provided the dextrose equivalent is not below 50. Also, certain sugar syrups of the hydrol and molasses type show these characteristics. All these high-molecular component sugar syrups fall into a preferred interval for the DE value according to the present invention.

The requirements of a binder system suitable for binding a mineral wool product so as to provide an adequate product and process for making such a product are many and varied in terms of physical parameters, some of which are explained below.

The viscosity and the content of large polymers in a sugar syrup generally may decrease with an increasing DE value. A large content of polymers should preferably be avoided for a mineral wool binder because this will provide a more sticky binder resulting in stickiness of the formed mineral wool mat or binder-containing web to the manufacturing equipment such as e.g. the forming chamber walls, the travelling conveyors, rollers and pendulums.

The solubility of the binder solution containing a sugar syrup may increase with increasing DE value. The binder solution must be sufficiently water soluble to provide a homogenous distribution of the binder on the mineral fibers making up the mineral wool mat or web to be cured.

On the other hand, a sugar syrup will generally result in a browning which is more pronounced with increasing DE value, thus leading to unwanted aesthetical appearance for a mineral wool product containing a binder system with sugar syrups, at least for some applications of the mineral wool product. Sugar syrups with too high a DE will also have a tendency to add to the boiling point elevation effect of the binder compared to low DE sugar syrups. The binder composition for a mineral wool web should preferably not have too high a boiling point since this will lead to an increase in curing time and thus result in higher curing temperatures and/or a physically longer curing oven length to provide a longer curing time.

The aqueous binder composition containing a sugar syrup will lower the water activity when increasing the DE value for the sugar syrup, and one of the effects of a low water activity may be that the binder is susceptible to moisture migration. This may create an unwanted uptake of moisture in the binder droplets in the uncured mineral wool web.

It has been found that a aqueous binder composition comprising a sugar syrup containing a reducing sugar having a dextrose equivalent DE of 50 to less than 85 will provide excellent products fulfilling the many demands to the binder in a mineral wool production line and the demands to the products obtained by using the binder.

The sugar syrup employed as component (a) contains a reducing sugar and may additionally contain a carbohydrate compound that yields one or more reducing sugars in situ under thermal curing conditions. The sugar or carbohydrate compound may be a monosaccharide in its aldose or ketose form, including a disaccharide, a triose, a tetrose, a pentose, a hexose, or a heptose; or a di-, oligo- or polysaccharide; or combinations thereof. Specific examples are glucose (=dextrose), starch hydrolysates such as corn syrup, arabinose, xylose, ribose, galactose, mannose, fructose, maltose, lactose and invert sugar. Compounds such as sorbitol and mannitol, on the other hand, which do not contain or supply aldehyde or ketone groups, are less effective in the instant invention.

The sugar syrup may be prepared by any known process. FIG. 1 is a diagram showing the sequence of steps employed in typical embodiments of such conventional methods. This diagram was published by the International Starch Institute, Science Park Aarhus, Denmark, and is available under www.starch.dk "Starch Sweeteners".

Crude Hydrolysate from Starch-Based Glucose Refining and Treated Crude Hydrolysate from Starch-Based Glucose Refining An example of a typical commercial process involving acidic hydrolysis comprises adding an acid such as hydrochloric acid to a water slurry of starch (purified starch milk) in order to acidify it before cooking. The acidified slurry is then heated to the desired liquefaction temperature and kept at that temperature until the required degree of hydrolysis has been obtained. The combination of reaction time, temperature and concentration of acid controls the degree of hydrolysis. After neutralization of the acid, the crude hydrolysate may be filtered and refined by means of activated carbon and/or ion exchange in order to remove impurities, discoloration and by-products formed during the hydrolysis and to give a so-called treated crude hydrolysate. Depending on raw material and end product requirements, various filtration steps, active carbon treatment steps and ion exchange steps for deionization etc. may be added to the process. Any sequence of refining steps may be employed, for instance, (1) filtration/ion exchange/carbon treatment; (2) filtration/carbon treatment/ion exchange; and for very high quality (3) filtration/carbon treatment/ion exchange/carbon treatment.

Treatment of the crude hydrolysate may lead to a sugar syrup such as a high DE corn syrup (a high DE glucose syrup) having a DE of from 55 to 70.

In certain instances, however, for instance, if the further reaction of the sugar component (a) requires an additional nitrogen source as a reactant, it may be preferable to employ the sugar syrup (a) without any prior removal of proteins and/or oils through refining For instance, in a specific embodiment only ions (salts) are removed from the crude hydrolysate by ion exchange using cationic and/or anionic resins resulting in an embodiment of a treated crude hydrolysate from the starch-based glucose refining.

Hydrolysis with acid catalysts allows the manufacture of intermediate conversion products ranging from 35-55 DE. Intermediate and higher conversion products with DE from 28 up to 98 can be made by substituting acid with enzymes. This is typically done in a two-step process. For the first step (liquefaction), thermo-stable α-amylase, or acid is used. After cooling and pH adjustment, a saccharification enzyme such as amyloglucosidase is employed. Except for a different holding time, pH and temperature, the processes are in principle the same, regardless of the catalyst. However, enzymes and acid break down the starch differently, resulting in different sugar composition of identical DE.

High fructose syrups are produced from refined high DE dextrose syrups in an enzymatic process using isomerase immobilised on a resin which enzymatically converts glucose to fructose. These syrups are conventionally referred to as HFSS and are also suitable sugar syrups which may, for instance, be provided with a DE around 55.

Also, the commercially available wort syrups for beer brewing may provide a suitable sugar syrup for the binder composition.

Hydrol

In one specific embodiment of the present invention, "hydrol" is employed as the sugar component (a). "Hydrol" is the mother liquor or residual liquor remaining from the crystallization of dextrose from dextrose syrup with a high concentration of dextrose, for instance, 55 to 75% by weight of dextrose. Hydrol generally has a DE of from 72 to 85. Hydrol is also often referred to as "starch molasses".

As explained earlier, the usual commercial manufacture of crystalline dextrose involves subjecting a water slurry of starch to hydrolysis by means of heat in the presence of acid or an enzyme under controlled conditions of temperature, pH and time in the first stage of the hydrolysis usually referred to as liquefaction. This is followed by the second stage hydrolysis called saccharification where enzymes are used under a different set of controlled conditions of temperature, pH and time. In an exemplary embodiment, the reaction is, for instance, allowed to continue until the starch has been hydrolyzed to produce a liquor of about 90-98 DE, preferably 90-93 DE, containing about 85-96% by weight, preferably about 85-90% by weight, of dextrose, measured on a dry basis, together with other sugars. When it is hydrolyzed as far as desired, the liquor is refined and evaporated to a concentration of 74-78% by weight of dry substance after which it is then cooled and seeded with crystallized dextrose and allowed to develop crystals in a water-jacketed crystallizer. The dextrose crystals are subsequently separated from the liquor, for instance, by centrifuging.

The mother liquor, known as first greens in current conventional practice, is subsequently concentrated to 74-78% by weight of dry substance. This syrup, now known as the second sugar syrup or greens, is concentrated and recrystallized in a manner similar to the first sugar syrup and the resulting dextrose crystals centrifugally separated. The mother liquor from this second crystallization is typically concentrated to 71% by weight of dry substance. This syrup is known as "hydrol".

Alternatively it is possible to recycle part of the mother liquid from the first crystallization back into the process at a stage before the first crystallization. In this case, only one crystallization stage is necessary and hydrol is made by bleeding off some of the recycled mother liquor in the hydrol evaporation step.

The hydrol itself may be hydrolyzed with a mineral acid converting the bulk of the oligosaccharides to dextrose.

Molasses

In another specific embodiment of the present invention, molasses is employed as a carbohydrate compound that yields one or more reducing sugars upon treatment with acids such as, e.g., sulfuric acid.

The term "molasses" as used herein generically embraces many types of molasses with varied sugar content and sugar type and other constituents making up the molasses. Sugar cane and beet molasses products are by far the most common types. Molasses have a typical total solids content of 60-80% by weight.

The compositions stated below represent typical compositions of the different types of molasses. As is often found with industrial by-products, the chemical composition of molasses shows wide variation. Its composition is influenced by factors such as soil type, ambient temperature, moisture, season of production, variety, production practices at a particular processing plant, and by storage variables.

Cane molasses is a by-product in the manufacture or refining of sucrose from sugar cane. It may contain more than 46% by weight of total sugars expressed as invert sugar.

Beet molasses is a by-product in the manufacture of sucrose from sugar beets. It may contain more than 48% by weight of total sugars expressed as invert sugar.

Citrus molasses is the partially dehydrated juices obtained from the manufacture of dried citrus pulp. It may contain more than 45% by weight of total sugars expressed as invert sugar. The canning of hearts, juice, and citrus concentrate leads to a pulp of e.g. peel, rag, and seed. This residue or fresh pulp contains about 85% of moisture mostly as bound water, or water of constitution. In one process for making citrus molasses, addition of calcium salts to the fresh pulp liberates the bound water. One-half of the water is then removed by pressure. The pulp is dehydrated into dried citrus pulp. The press juice contains about 5% solids, mainly sugars. Evaporation of this material under partial vacuum to about one-thirteenth of the original volume results in a light colored sweet viscous syrup known to the feed industry as "citrus molasses."

Wood molasses is a by-product in the manufacture of pressed wood. It is the concentrated soluble material obtained from the treatment of wood at elevated temperature and pressure with or without use of acids, alkalis, or salts. It contains pentose and hexose sugars, and may have a total carbohydrate content of not less than 55% by weight. Hemicellulose extract is often referred to as wood molasses. The wood molasses products are also often described in the art as aqueous soluble hemicellulose extracts of wood.

To convert cellulose into glucose, in one process, high temperatures and pressures are required when dilute acids are used. With concentrated acids, the process can be carried out at room temperature. Hemicellulose is more easily converted into sugars. The hemicellulose from hardwood (e.g. maple and beech) yields a high percentage of pentoses, while hemicellulose from softwood (e.g. pine and fir) yields a 1:1 mixture of pentoses and hexoses.

In another process, hemicellulose from wood is solubilized by steam during the manufacture of hardboard. This process is economical as it essentially does not require chemicals. The hemicellulose sugars are concentrated or spray-dried and available under the name wood molasses.

The molasses may be hydrolyzed with a mineral acid converting the bulk of the disaccharides and oligosaccharides to dextrose.

In one embodiment, a sugar syrup of wood molasses is used as the sugar syrup (a); the wood molasses is preferably used without having undergone an ion exchange refining step.

In another embodiment, a sugar syrup of wood molasses is used as the sugar syrup (a), wherein the wood molasses has been treated by refining to be essentially free of calcium, potassium, sodium and chlorine.

Polycarboxylic Acid Component (b)

The polycarboxylic acid component (b) is generally selected from dicarboxylic, tricarboxylic, tetracarboxcylic, pentacarboxylic, and like monomeric polycarboxylic acids, and anhydrides, salts and combinations thereof, as well as polymeric polycarboxylic acids, anhydrides, copolymers, salts and combinations thereof.

Specific examples of suitable polycarboxylic acid components (b) are citric acid, aconitic acid, adipic acid, azelaic acid, butane tricarboxylic acid, butane tetracarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized to alcohol then carboxylic acid, maleic acid, malic acid, mesaconic acid, oxalic acid, phthalic acid, tetrahydrophthalic acid, hexahydrophthalic acid, terephthalic acid, sebacic acid, succinic acid, tartaric acid, aspartic acid, trimellitic acid, pyromellitic acid, trimesic acid, and anhydrides, salts and combinations thereof.

Amine Component (c)

In the preparation of the binder composition according to the present invention, an amine component (c) is used which adds to the amines which may already be present in the sugar component (a) in amounts sufficient to form the desired binder resin. Thus, unrefined sugar syrups which have not undergone any prior refining aiming at removal of proteins and/or oils may be employed without addition of an amine component (c).

Suitable amine components (c) are, for instance, ammonia, ammonium salts, primary or secondary amines, alkanolamines and amino acids.

Specific examples of ammonium salts are ammonium chloride, ammonium sulfate, ammonium phosphate and the ammonium salts of the polycarboxylic acids (b).

Specific examples of suitable primary and secondary amines are alkyl amines and dialkyl amines like methyl amine, dimethyl amine, propyl amine, butyl amine and polyamines like ethylene diamine.

Specific examples of suitable alkanolamines are diethanolamine, triethanolamine, diisopropanolamine, triisopropanolamine, methyldiethanolamine, ethyldiethanolamine, n-butyldiethanolamine, methyldiisopropanolamine, ethylisopropanolamine, ethyldiisopropanolamine, 3-amino-1,2-propanediol, 2-amino-1,3-propanediol, aminoethylethanolamine and tris(hydroxymethyl)aminomethane.

Specific examples of amino acids are glycine, alanine, valine, leucine, serine, lycine and arginine.

Urea and urea compounds such as cyclic ureas may also be used as a source for the amine component (c). The use of urea in the binder composition has the additional advantage of better fire properties of the cured binder in the mineral wool product.

Reaction Product (d) of Polycarboxylic Acid Component (b) and Amine (c)

In accordance with a specific embodiment of the present invention, the binder composition comprises a water-soluble reaction product of a polycarboxylic acid component (b) and an amine (c) as an optional component (d). A particularly preferred embodiment of that type comprises using the water-soluble reaction product of at least one carboxylic anhydride and at least one alkanolamine as component (d).

Preferred alkanolamines for use in the preparation of optional binder component (d) are alkanolamines having at least two hydroxy groups such as, for instance, alkanolamines represented by the formula

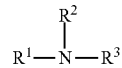

wherein $R^1$ is hydrogen, a $C_{1-10}$ alkyl group or a $C_{1-10}$ hydroxyalkyl group; and $R^2$ and $R^3$ are $C_{1-10}$ hydroxyalkyl groups. Preferably, $R^2$ and $R^3$, independently are $C_{2-5}$ hydroxyalkyl groups, and $R^1$ is hydrogen, a $C_{1-5}$ alkyl group or a $C_{2-5}$ hydroxyalkyl group. Particularly preferred hydroxyalkyl groups are β-hydroxyalkyl groups.

Specific examples of suitable alkanolamines are diethanolamine, triethanolamine, diisopropanolamine, triisopropanolamine, methyldiethanolamine, ethyldiethanolamine, n-butyldiethanolamine, methyldiisopropanolamine, ethylisopropanolamine, 3-amino-1,2-propanediol, 2-amino-1,3-propanediol and tris(hydroxymethyl)amino-methane. Diethanolamine is the currently preferred alkanolamine The carboxylic anhydride reactant may be selected from saturated or unsaturated aliphatic and cycloaliphatic anhydrides, aromatic anhydrides and mixtures thereof, saturated or unsaturated cycloaliphatic anhydrides, aromatic anhydrides and mixtures thereof being preferred. In a particularly preferred embodiment of the invention, two different anhydrides selected from cycloaliphatic and/or aromatic anhydrides are employed. These different anhydrides are preferably reacted in sequence.

Specific examples of suitable aliphatic carboxylic anhydrides are succinic anhydride, maleic anhydride and glutaric anhydride. Specific examples of suitable cycloaliphatic anhydrides are tetrahydrophthalic anhydride, hexahydrophthalic anhydride, methyltetrahydrophthalic anhydride and nadic anhydride, i.e. endo-cis-bicyclo[2.2.1]-5-heptene-2,3-dicarboxylic anhydride. Specific examples of suitable aromatic anhydrides are phthalic anhydride, methylphthalic anhydride, trimellitic anhydride and pyromellitic dianhydride.

In the above embodiment employing two different anhydrides, a combination of cycloaliphatic anhydride and aromatic anhydride is particularly preferred, e.g. a combination of tetrahydrophthalic anhydride (THPA) and trimellitic anhydride (TMA). The molar ratio of cycloaliphatic anhydride to aromatic anhydride is preferably within the range of from 0.1 to 10, more preferably within the range of from 0.5 to 3.

In the preparation of binder component (d), the proportion of the alkanolamine and carboxylic anhydride reactants is preferably selected such that the ratio of equivalents of amine plus hydroxy groups (NH+OH) to equivalents of carboxy groups (COOH) is at least 0.4, more preferably at least 0.6.

On the other hand, the properties of the final binder composition, such as curing behavior, durability and humidity resistance are determined by the total ratio of reactive groups present. Therefore, for optimum performance, the ratio of equivalents of amine plus hydroxy groups (NH+OH) to equivalents of carboxy groups (COOH) in the final binder composition is preferably adjusted to 2.0 or less, more preferably to 1.7 or less. In general, the final binder composition has an equivalent ratio of (NH+OH)/(COOH) within the range of from 1.25 to 1.55.

The reaction between the alkanolamine and carboxylic anhydride reactants is carried out in the usual manner, for instance, as described in WO 99/36368, WO 01/05725, WO 02/06178, WO 2004/007615 and WO 2006/061249, the entire contents of which is incorporated herein by reference.

If appropriate, an additional acid monomer may be employed in the reaction and is preferably added to the reaction mixture before addition of the anhydride reactant. Specific examples of suitable acid monomers are di-, tri- and polycarboxylic acids such as adipic acid, citric acid, sebacic acid, azelaic acid, succinic acid, tartaric acid and trimellitic acid.

The reaction temperature is generally within the range of from 50° C. to 200° C. In a preferred embodiment and, in particular, when two different anhydrides are employed, the alkanolamine is first heated to a temperature of at least about 40° C., preferably at least about 60° C., whereafter the first anhydride is added and the reaction temperature is raised to at least about 70° C., preferably at least about 95° C. and more preferably at least about 125° C., at which temperature the second anhydride is added to the reaction mixture when substantially all the first anhydride has dissolved and/or reacted. Increasing the reaction temperature from 70-95° C. to 100-200° C. allows a higher conversion of monomers to oligomers. In this case, a preferred temperature range is 105-170° C., more preferably 110-150° C.

If water is added after the first anhydride has reacted, either together with the second anhydride or before addition of the second anhydride or at the end of the reaction, in an amount to make the binder easily pumpable, a binder having an increased molecular weight (compared to water addition from the start) is obtained which still has a desired pumpability, viscosity, and water dilutability and contains less unreacted monomers.

In order to improve the water solubility and dilutability of the binder, a base may be added up to a pH of about 8, preferably a pH of between about 5-8, and more preferably a pH of about 6. Furthermore, the addition of a base will cause at least partial neutralization of unreacted acids and a concomitant reduction of corrosiveness. Normally, the base will be added in an amount sufficient to achieve the desired water solubility or dilutability. The base is preferably selected from volatile bases which will evaporate at or below curing temperature and hence will not influence curing. Specific examples of suitable bases are ammonia (NH.sub.3) and organic amines such as diethanolamine (DEA) and triethanolamine (TEA). The base is preferably added to the reaction mixture after the reaction between the alkanol amine and the carboxylic anhydride has been actively stopped by adding water.

Other Components of Binder Composition

The binder compositions according to the present invention may additionally comprise one or more conventional binder additives. These include, for instance, curing accelerators such as, e.g., β-hydroxyalkylamides; the free acid and salt forms of phosphoric acid, hypophosphorous acid and phosphonic acid. Other strong acids such as boric acid, sulfuric acid, nitric acid and p-toluenesulfonic acid may also be used, either alone or in combination with the just mentioned acids, in particular with phosphoric, hypophosphorous acid or phosphonic acid. Other suitable binder additives are silane coupling agents such as .gamma.-aminopropyltriethoxysilane; thermal stabilizers; UV stabilizers; emulsifiers; surface active agents, particularly nonionic surfactants; biocides; plasticizers; anti-migration aids; coalescents; fillers and extenders such as carbohydrates, clay, silicates and magnesium hydroxide; pigments such as titanium dioxide; hydrophobizing agents such as fluorinated compounds, mineral oils and silicone oils; flame retardants; corrosion inhibitors such as thiourea; urea; antifoaming agents; antioxidants; and others.

These binder additives and adjuvants may be used in conventional amounts generally not exceeding 20 wt. % of the binder solids. The amount of curing accelerator in the binder composition is generally between 0.05 and 5 wt. %, based on solids.

Final Binder Composition

The aqueous binder composition according to the present invention preferably comprises 50 to 85 percent by weight of sugar syrup (a); 5 to 25 percent by weight of polycarboxylic acid (b); and 1 to 8 percent by weight of amine (c), based on the total weight (dry matter) of binder components (a), (b) and (c).

The aqueous binder composition generally has a solids content of from 1 to 20 wt. % and a pH of 6 or greater.

Mineral Fiber Product

The mineral fibers employed may be any of man-made vitreous fibers (MMVF), glass fibers, ceramic fibers, basalt fibers, slag wool, rock wool, stone wool and others.

Suitable fiber formation methods and subsequent production steps for manufacturing the mineral fiber product are those conventional in the art. Generally, the binder is sprayed immediately after fibrillation of the mineral melt on to the airborne mineral fibers. The aqueous binder composition is normally applied in an amount of 0.1 to 10%, preferably 0.2 to 8% by weight, of the bonded mineral fiber product on a dry basis.

The spray-coated mineral fiber web is generally cured in a curing oven by means of a hot air stream. The hot air stream may be introduced into the mineral fiber web from below, or above or from alternating directions in distinctive zones in the length direction of the curing oven.

The curing may take place in accordance with a Maillard-type reaction route between two or more of the constituents of the binder composition. Preferably, there may be several reaction routes taking place during the curing. Typically, the curing oven is operated at a temperature of from about 150° C. to about 350° C. Preferably, the curing temperature ranges from about 200 to about 300° C. Generally, the curing oven residence time is from 30 seconds to 20 minutes, depending on, for instance, the product density.

If desired, the mineral wool web may be subjected to a shaping process before curing. The bonded mineral fiber product emerging from the curing oven may be cut to a desired format e.g., in the form of a batt. Thus, the mineral fiber products produced may, for instance, have the form of mats, baits, slabs, sheets, plates, strips, rolls, granulates and other shaped articles. In accordance with the present invention, it is also possible to produce composite materials by combining the bonded mineral fiber product with suitable composite layers or laminate layers such as, e.g., metal, glass surfacing mats and other woven or non-woven materials.

The following examples are intended to further illustrate the invention without limiting its scope.

Example 1

Binder Composition Containing a Crude Starch Hydrolysate 100 g of crude starch hydrolysate having a concentration of 70% by weight of dry substance is obtained by the process described in GB-A-1157515. The crude hydrolysate is mixed in water with 15 g of citric acid and 25 ml of 20% aqueous ammonia. A silane such as γ-aminopropyltriethoxysilane is added to the aqueous solution to provide a binder for mineral wool.

Example 2

Binder Composition Containing Hydrol 100 g of hydrol from the refining process of making a glucose syrup having a DE of 73, a concentration of 73% by weight of dry substance and 50% sugars, 6.0% ash, 2.5% sodium, 3.0% chlorine is treated to remove salts and then mixed in water with 15 g of citric acid and 25 ml of 20% aqueous ammonia γ-aminopropyltriethoxysilane is added to the aqueous solution to provide a binder for mineral wool.

Example 3

Binder Composition Containing Wood Molasses 100 g of wood molasses having a concentration of 65% by weight of dry substance and 55% sugars, 5.0% ash, 0.8% calcium, 0.05% phosphorous, 0.04% potassium and substantially no chlorine or sodium, is mixed in water with 15 g of citric acid and 25 ml of 20% aqueous ammonia. γ-aminopropyltriethoxysilane is added to the aqueous solution to provide a binder for mineral wool.

Example 4

Binder Composition Containing a Crude Starch Hydrolysate 100 g of crude starch hydrolysate having a concentration of 70% by weight of dry substance is mixed in water. 30 g of a batch of a reaction product mixture is added made by the following procedure: 82 kg of diethanolamine (DEA) is charged in a 400 l reactor and heated to 60° C. Then, a first portion of 72 kg of tetrahydrophthalic anhydride (THPA) is added. After raising the temperature and keeping it at 130° C. for 1 hour, 75 kg of trimellitic anhydride (TMA) and a second portion of 50 kg of THPA are added. The reaction mixture is cooled to 95° C., water is added and the mixture is stirred for 1 hour. A silane such as γ-aminopropyltriethoxysilane is added to the aqueous solution of the crude starch hydrolysate and the reaction product mixture to provide a binder for mineral wool.

Example 5

The binders of Examples 1-4 are used in the production of rock wool insulating products by spraying the binder solutions through nozzles near the cascade rotor apparatus into the formed cloud of fibers in the forming chamber. The coated fibers are collected on transport conveyors and transferred into a curing oven for a curing time of 5 minutes at a curing temperature of 225° C.

The mineral wool product obtained has a density of about 100 kg/m$^3$, a thickness of 120 mm and a binder content of 7% (Loss on Ignition LOI).

Example 6

Preparation of Resin/Binder Component B1

158 g of diethanolamine are placed in a 1-liter glass reactor provided with a stirrer and a heating/cooling jacket. The temperature of the diethanolamine is raised to 60° C. whereafter 91 g of tetrahydrophthalic anhydride are added. After raising the temperature and keeping it at 130° C., a second portion of 46 g of tetrahydrophthalic anhydride is added followed by 86 g of trimellitic anhydride. After reacting at 130° C. for 1 hour, the mixture is cooled to 95° C. and 210 g of water added and the mixture stirred for 1 hour. After cooling to ambient temperature, the obtained resin is ready for use.

Based upon the above obtained resin a binder is made from the resin by addition of ammonia to pH 6.5 and 2% of hypophosphorous acid. The solids content of the binder was measured as 53% at 200° C., 1 hour.

Preparation of Mixtures of B1 and a Sugar

The binder compositions shown in Table 1 were tested.

TABLE 1

| Binder composition | Dextrose Equivalent (DE) of sugar syrup |
| --- | --- |
| 100% B1 | (not defined) |
| 50% B1 + 50% Mylose 120 | 25-32 |
| 50% B1 + 50% Mylose 661 | 42 |
| 50% B1 + 50% Glucoplus 361 | 62 |
| 50% B1 + 50% Glucosweet 660 | 73-79 |
| 50% B1 + 50% Sirodex 331 | 95 |
| 50% B1 + 50% Dextrose | 100 |

All percentages are wt. % dry matter

The sugar syrups are all trademarks and available from Syral.

The sugar preparations in Table 1 are made by mixing the following components:

| Binder Component B1 (g) | Sugar | Solids content of sugar 1 h at 200° C. | Amount of sugar (g) |
| --- | --- | --- | --- |
| 100 | Mylose 120 | 68.6% | 77.3 |
| 100 | Mylose 661 | 76.8% | 69.0 |
| 100 | Glucoplus 361 | 70.9% | 74.8 |
| 100 | Glucosweet 660 | 66.5% | 79.7 |
| 100 | Sirodex 331 | 60.1% | 88.2 |
| 100 | Dextrose | 56% | 94.6 |

All of the above binders were mixed with a standard silane (gamma-aminopropyl-triethoxysilane) in an amount of 1.4% of the total solids Finally, the binders were diluted with water to 15% or 20% solids.

Humidity Resistance

A humidity resistance test was carried out by applying the binder composition to a filter made of quartz fibers. The sample with binder was cured in 6 minutes at 200° C., the weight of the cured sample was measured, and then the sample was placed in a chamber with a controlled atmosphere of 95% humidity at 70° C. The weight of the sample was then measured again after 14 days. The weight gain of the sample is ascribed to a water uptake from the water vapor in the chamber.

The relative weight uptake was calculated and is depicted as a percentage value in FIG. 1 for each sample along with the corresponding dextrose equivalent value DE, provided by Syral. The standard deviations along with the percentage values are shown in Table 2

TABLE 2

| Binder composition | | Water uptake (%) | Standard deviation of 6 measurements |
| --- | --- | --- | --- |
| 100% B1 (*) | 3 weeks | 11.2 | 2.8 |
| | 10 weeks | 21.9 | 3.5 |
| | 14 weeks | 42.2 | 4.3 |
| 50% B1 + 50% Mylose 120 | 3 weeks | 22.4 | 2.9 |
| | 10 weeks | 29.0 | 2.8 |
| | 14 weeks | 60.7 | 4.0 |

TABLE 2-continued

| Binder composition | | Water uptake (%) | Standard deviation of 6 measurements |
|---|---|---|---|
| 50% B1 + 50% Mylose 661 | 3 weeks | 33.1 | 1.6 |
| | 10 weeks | 43.6 | 1.5 |
| | 14 weeks | 47.9 | 2.2 |
| 50% B1 + 50% Glucoplus 361 | 3 weeks | 12.9 | 3.5 |
| | 10 weeks | 15.3 | 2.2 |
| | 14 weeks | 35.2 | 8.2 |
| 50% B1 + 50% Glucosweet 660 | 3 weeks | 20.1 | 2.0 |
| | 10 weeks | 29.4 | 1.7 |
| | 14 weeks | 32.2 | 1.7 |
| 50% B1 + 50% Sirodex 331 | 3 weeks | 23.8 | 4.4 |
| | 10 weeks | 35.7 | 4.5 |
| | 14 weeks | 39.1 | 4.4 |
| 50% B1 + 50% Dextrose | 3 weeks | 23.7 | 2.2 |
| | 10 weeks | 35.7 | 1.4 |
| | 14 weeks | 39.6 | 0.9 |

It can be seen that there is less water uptake for the binder compositions containing the sugar syrups Glucoplus 361 and Glucosweet 660 having DE-values of 62 and 76 (average value 73-79), respectively, is compared to the water uptake for binder compositions having both lower DE-values of 25-42 and higher DE-values of 95-100. The water uptake is a measure of the humidity resistance Mechanical Strength Mechanical strength was tested in a so-called grit bar test. Several bars are manufactured in a moulding process for mechanical testing. The test bars consist of a mixture of binder and stone wool shots from the stone wool spinning production. The shots are particles having the same melt composition as the stone wool fibers, and the shots are normally considered a waste product from the spinning process. The shots used for the test bar composition have a size of 0.25-0.50 mm. Approximately 90 g of binder with a dry weight content of 15% are mixed with 450 g of shots and moulded into 8 test bars.

The bars measure 140 mm×25 mm×5 mm.

The test bars are cured for 2 hours at 250° C.

The test bars are subjected to a 3-point bending test in a bending strength apparatus with the following settings of a velocity of 10 mm/min, a load of 1.0 kN and a span between support of bars of 10 cm. The strengths are reported in $N/mm^2$.

A measured value of approx 4.3 $N/mm^2$ is considered to provide a sufficient binder strength. The standard deviations along with the percentage values are shown in Table 3.

TABLE 3

| Binder composition | Strength ($N/mm^2$) | Standard deviation of 6 measurements ($N/mm^2$) |
|---|---|---|
| 100% B1 (*) | 4.68 | 0.39 |
| 50% B1 + 50% Mylose 120 | 5.99 | 0.92 |
| 50% B1 + 50% Mylose 661 | 5.66 | 0.66 |
| 50% B1 + 50% Glucoplus 361 | 5.09 | 0.52 |
| 50% B1 + 50% Glucosweet 660 | 5.94 | 0.73 |
| 50% B1 + 50% Sirodex 331 | 5.4 | 0.9 |
| 50% B1 + 50% Dextrose | 5.34 | 0.8 |

The measured strengths of all binder compositions are found to be sufficient. All sugar-containing samples had a value slightly higher than the reference value of the B1 binder of 4.68 $N/mm^2$.

What is claimed is:

1. An aqueous binder composition, wherein the composition comprises:
   (a) a sugar syrup comprising a reducing sugar and having a dextrose equivalent DE of at least 50 and less than 85;
   (b) an amine component which comprises an ammonium salt;
   (c) a polycarboxylic acid and/or a reaction product of amine component (b) and a polycarboxylic acid.

2. The aqueous binder composition of claim 1, wherein sugar syrup (a) has a dextrose equivalent DE of at least 55 and less than 80.

3. The aqueous binder composition of claim 1, wherein sugar syrup (a) has a dextrose equivalent DE of at least 60 and less than 75.

4. The aqueous binder composition of claim 1, wherein sugar syrup (a) is selected from one or more of high DE glucose syrups, crude hydrolysates from starch-based glucose refining, treated crude hydrolysates from starch-based glucose refining, hydrols, and molasses.

5. The aqueous binder composition of claim 4, wherein the molasses is selected from one or more of cane molasses, beet molasses, citrus molasses, and wood molasses.

6. The aqueous binder composition of claim 1, wherein sugar syrup (a) is employed without any prior removal of proteins and/or oils.

7. The aqueous binder composition of claim 1, wherein sugar syrup (a) has been subjected to ion exchange with at least one of a cationic resin and an anionic resin.

8. The aqueous binder composition of claim 1, wherein amine component (b) comprises an ammonium salt of an inorganic acid.

9. The aqueous binder composition of claim 8, wherein amine component (b) comprises ammonium phosphate.

10. The aqueous binder composition of claim 8, wherein amine component (b) comprises ammonium sulfate.

11. The aqueous binder composition of claim 8, wherein the composition has a pH of 6 or higher.

12. The aqueous binder composition of claim 1, wherein amine component (b) further comprises at least one of a primary amine, a secondary amine, an alkanolamine, an amino acid, urea.

13. The aqueous binder composition of claim 1, wherein the composition further comprises a curing accelerator.

14. The aqueous binder composition of claim 1, wherein the composition has a pH of 6 or higher.

15. The aqueous binder composition of claim 1, wherein the polycarboxylic acid of (c) is selected from one or more of dicarboxylic, tricarboxylic, tetracarboxylic, pentacarboxylic, and like monomeric polycarboxylic acids, anhydrides, salts, and combinations thereof, as well as polymeric polycarboxylic acids, anhydrides, copolymers, salts, and combinations thereof.

16. The aqueous binder composition of claim 1, wherein the polycarboxylic acid of (c) is selected from one or more of citric acid, aconitic acid, adipic acid, azelaic acid, butane tricarboxylic acid, butane tetracarboxylic acid, chlorendic acid, citraconic acid, dicyclopentadiene-maleic acid adducts, fully maleated rosin, maleated tall-oil fatty acids, fumaric acid, glutaric acid, isophthalic acid, itaconic acid, maleated rosin oxidized to alcohol then carboxylic acid, maleic acid, malic acid, mesaconic acid, oxalic acid, phthalic acid, tetrahydrophthalic acid, hexahydrophthalic acid, terephthalic acid, sebacic acid, succinic acid, tartaric acid, aspartic acid, trimellitic acid, pyromellitic acid, trimesic acid, and anhydrides, salts, and combinations thereof.

17. The aqueous binder composition of claim 1, wherein the polycarboxylic acid of (c) comprises a carboxylic anhydride.

18. A method of producing a bonded mineral fiber product, wherein the method comprises: fiberizing a mineral melt to form mineral fibers; carrying the formed mineral fibers by a gas stream into a forming chamber; applying a thermosetting binder onto the mineral fibers to form coated fibers; depositing the coated fibers as a mineral fiber web on a receiver; and transferring the mineral fiber web to a curing oven for curing of the binder and forming a bonded mineral fiber product; the binder comprising the aqueous binder composition of claim 1.

19. A mineral fiber product comprising mineral fibers in contact with a cured binder composition, wherein the binder composition comprises the aqueous binder composition of claim 1.

\* \* \* \* \*